United States Patent [19]

Enters et al.

[11] 4,012,963
[45] Mar. 22, 1977

[54] CLUTCH MECHANISM FOR ROTARY TILLERS AND THE LIKE

[75] Inventors: Edward W. Enters, Fredonia; Mark J. Itle, Sheboygan, both of Wis.

[73] Assignee: Gilson Bros. Co, Plymouth, Wis.

[22] Filed: Feb. 23, 1976

[21] Appl. No.: 660,129

[52] U.S. Cl. .................................. 74/242.15 R
[51] Int. Cl.² ...................................... F16H 7/10
[58] Field of Search ............... 74/242.15 R, 242.12, 74/242.8, 242.1 R

[56] References Cited

UNITED STATES PATENTS

| | | | |
|---|---|---|---|
| 3,800,612 | 4/1974 | Fulghum | 74/242.15 R |
| 3,965,768 | 6/1976 | Foster | 74/242.15 R |

Primary Examiner—Leonard H. Gerin

[57] ABSTRACT

An idler sheave is carried by a bracket pivoted in a mount and fabricated as a part of the gear box housing of the tiller and is movable toward and away from a drive belt extending between two spaced sheaves, one a driven sheave and the other a relatively smaller drive sheave. The mount is located in the joint between die-cast halves of the gear box housing. The idler sheave engages the belt in the area of the larger driven sheave. A tension spring connects the idler sheave bracket to a second bracket which is in turn associated with a control mechanism capable of pivoting the second bracket and, through the tension spring, causing pivotal movement of the first bracket to move the idler sheave against and tension the belt on the drive and driven sheave. When the manipulative force on the control mechanism is released, gravity causes the idler sheave to fall away from the belt, that movement being transmitted through the tension spring to the second bracket and to the control mechanism.

7 Claims, 3 Drawing Figures

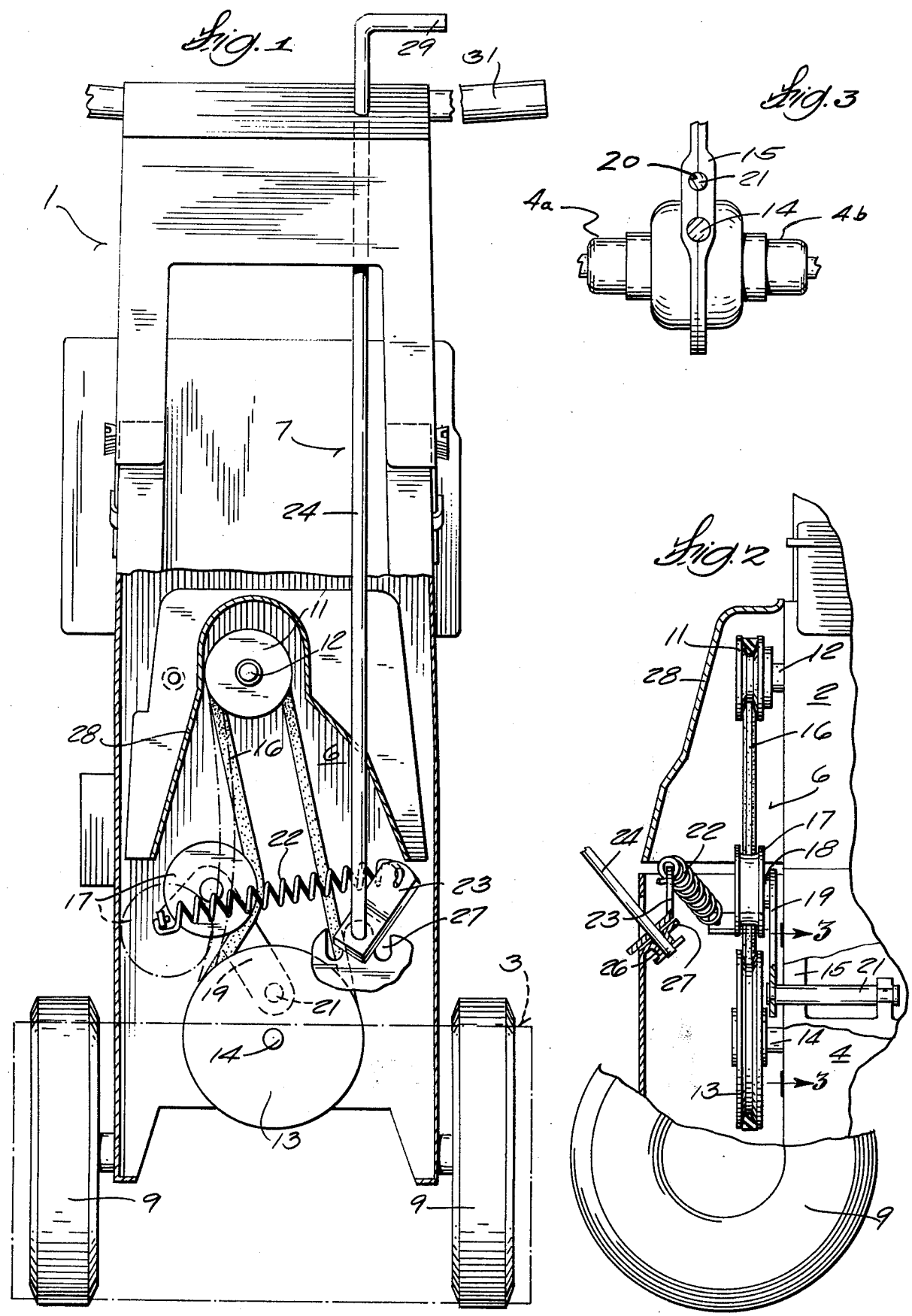

CLUTCH MECHANISM FOR ROTARY TILLERS AND THE LIKE

BACKGROUND OF THE INVENTION

This invention relates to drives for rotary tillers and the like and, more particularly, to clutch mechanisms for such power sources.

It is conventional and well known in the manufacture of rotary tillers, or the like, to utilize a belt drive to transmit movement from a drive sheave to a driven sheave, the latter being connected to a rotary tine assembly. Generally, the drive connection between the driving and driven sheaves is selectively controlled by permitting the belt to assume a slack condition relative to the sheaves in which condition no motion is transmitted between the sheaves or, alternatively, to tension the belt on the sheaves to transmit motion.

This invention is concerned with those types of belt-tensioning clutch arrangements and has among its general objects to provide an improved, simplified, and yet effective mechanism for selectively tensioning the belt drive.

SUMMARY OF THE INVENTION

For the achievement of these and other objects, this invention proposes a clutch arrangement wherein the drive sheave, normally connected to the crank shaft of a drive motor, is spaced from a driven sheave, which is connected to the shaft of a tine assembly or the like. The drive and driven sheaves are preferably arranged in a vertical plane. A flexible belt extends between the two sheaves. An idler sheave is carried by a bracket which is in turn carried, preferably, from a mount which is an integral part of the tiller gear box. Preferably the mount is at the joint between die-case halves of the gear box so that it can be provided without the need for machining. The idler sheave can be pivoted away from the belt or into tensioning engagement with the belt to draw the belt tightly over the drive and driven sheaves. A second bracket is pivotally mounted on the tiller frame and is spaced from the idler sheave bracket but is connected to that bracket so that motion is transmitted between the two.

The idler sheave is normally biased away from engagement with the belt. A control mechanism is connected to the second bracket and is capable of pivoting the second bracket against that bias to move the idler sheave into engagement with the belt to increase the tension on the belt. When the manipulative force on the control means is released, the idler sheave is returned, by the bias, toward a normal position relieving the tension on the belt.

Preferably, the connection between the bracket of the idler sheave assembly and the second bracket is made through a tension spring which functions, in addition to a motion transmitting member, to accommodate overtravel of the second bracket and prevent excessive tension on the belt should the manipulative force on the control means be too great. Also, it is preferable that the idler sheave and its support bracket, be located adjacent the larger of the sheaves and project above the sheave at an angle to the vertical. The former feature increases the range of speed adjustment available and the latter permits gravity to provide the bias on the idler sheave tending to move it away from the belt.

Other objects and advantages will be pointed out in or be apparent from, the specification and claims, as will obvious modifications of the embodiment shown in the drawings, in which:

FIG. 1 is a rear elevation of the clutch mechanism incorporated in a rotary tiller;

FIG. 2 is a side elevation, partially in section, further illustrating the association of the clutch mechanism with the remainder of a tiller assembly; and FIG. 3 is a section generally along line 3—3 in FIG. 2.

DESCRIPTION OF THE PREFERRED EMBODIMENT

As illustrated in a general manner in the drawings, a tiller 1 includes an engine 2, a tine assembly 3 and a gear box assembly 4. Clutch mechanism 6 is provided between the engine and the gear box to permit selective completion and interruption of the drive connection between the engine and tine assembly. The clutch mechanism 6 is manipulated through control mechanism 7. The clutch control mechanism 7 is associated with the tiller handle and provides the means for selective control over completion and interruption of the drive connection between the engine and the gear box.

In a conventional manner, the tilling operation is performed by starting the engine 2, engaging the clutch mechanism to complete the drive connection to the tine assembly causing it to rotate in a clockwise direction and the tiller, with the tine assembly rotating, is then advanced on wheels 9.

In accordance with this invention, a sheave 11 is connected to crank shaft 12 of the engine 2. A second sheave 13 is connected to drive shaft 14 of the tine assembly. The drive shaft being supported in gear box housing 15. In the illustrated, preferred embodiment, sheaves 11 and 13 are spaced vertically, one above the other. This arrangement is utilized since the engine has a horizontal crank shaft but the clutch mechanism of this invention can also be utilized with an engine having a vertical crank shaft wherein the sheaves could be arranged in a horizontal plane.

A flexible conventional V-belt 16 extends between sheaves 11 and 13. In the context of the clutch mechanism, sheave 11 will be referred to as a driving sheave and sheave 13 as a driven sheave, belt 16 being capable of transmitting motion between the two.

Normally, the length of belt 16 is such that, unless tensioned, it will rest in a slack condition relative to the sheaves and in which condition it is incapable of transmitting motion from sheave 11 to sheave 13. This will be referred to as the inoperative state of the clutch mechanism.

An idler sheave 17 is associated with the belt and is supported for movement toward the belt to tighten the belt on the sheaves and establish the drive or operative state of the clutch mechanism.

More particularly, sheave 17 is mounted on a stub-shaft 18 which is in turn carried by a bracket 19. Bracket 19 is attached to a pin 21 mounted in fixed relation to the basic tiller framework. In the illustrated preferred embodiment, pin 21 is journaled in a mount 20 which is cast as an integral part of the housing 15 of gear box 4. With this construction, sheave 18 and bracket 19 can pivot about the axis of pin 21 toward and away from an operative belt tensioning position (illustrated in full lines in FIG. 1).

Mount 20 is located at the joint 25 between the gear box halves 4a and 4b. Mount 20 is an elongated cylindrical hole and and gear box is preferably a die-cast part. Being a die-cast part mount 20 is ready to accept pin 21 without any machining or insertion of bearings.

Bracket 19 is positioned adjacent driven sheave 13 and extends above that sheave at an angle to the vertical. With that arrangement, the combined weight of the bracket and the sheave tends to rotate the sheave in a counterclockwise direction as viewed in FIG. 1, i.e., away from its operative belt tensioning position. At this point, it should be noted that this tendency to rotate in a counterclockwise direction is basically due to gravity but is considered a biasing force on the idler sheave so that reference to a bias acting on the idler sheave should be interpreted as including a spring mechanism, gravity, or the force exerted by the flexible belt itself in tending to straighten as the drive and driven sheaves are rotated.

By placing the idler sheave adjacent the driven sheave 13, the larger of the driving and driven sheaves, greater latitude is provided in the range of available belt lengths which can be accommodated. The position of the idler sheave can be varied through a greater arc to accommodate a wider variation in belt lengths. Also, greater leverage on the belt can be obtained because the idler is working on the larger diameter of the driven sheave.

In order to engage the clutch mechanism, bracket 19 must be pivoted with a positive force into engagement with the belt 16 and held in that position by a positive force. In the illustrated embodiment, this movement is achieved through a combination tension spring 22 and bracket 23. Spring 22 is connected to both brackets 19 and 23 and extends therebetween to provide a motion transmitting connection. Bracket 23 is welded, or otherwise fixedly attached, to a control rod 24 of the clutch control mechanism. The lower end of the control rod extends through an opening 26 provided in a shelf 27 lanced from a clutch shield 28. The clutch shield is fixedly attached to the basic framework of the tiller.

Control rod 24 extends along the tiller handle to the upper handle portion and includes a lateral projection 29 which is in the area of one of the hand grip portions 31 of the handle.

With reference to FIG. 1, when projection 29 is rotated in a clockwise direction, bracket 23 is rotated in the same direction. This motion is transmitted through spring 22 to bracket 19 which causes that bracket together with the idler sheave to pivot in a clockwise direction and engaged belt 16 tightening it on sheaves 11 and 13 to complete the drive connection. When the manipulative force on projection 29 is released, the weight of bracket 19 and sheave 17, together with a belt force from the natural tendency of the belt to straighten without a holding force thereon, causes the idler sheave to pivot in a counterclockwise direction toward the dotted line position in FIG. 1 releasing the force on the flexible belt and causing the belt to again go slack and interrupt the drive connection. Counterclockwise movement of bracket 19 is transmitted through spring 22 to bracket 23 causing the control rod and the upper projection 29 thereof to return to their initial rest position.

In addition to providing a form of motion transmission as between bracket 19 and 23, spring 22 provides inherent overtravel protection. Should an excessive force be applied to projection 29 which might unduly tension belt 16, a portion of that force will be absorbed in extension of spring 22 and will not be transmitted to the idler sheave and cannot result in excessive pressure on the belt.

In the illustrated preferred embodiment, the idler sheave assembly (sheave 17 and bracket 19) are positioned to one side of belt 16 whereas bracket 23 is positioned on the opposite side of the belt. This arrangement provides for effective operating forces with a relatively compact arrangement.

A further feature of the just described clutch mechanism is that it inherently provides a type of "dead man's" operation. In order for the tine assembly to rotate, a force must be maintained on projection 29 to hold the idler sheave in engagement with belt 16. If for any reason that force is removed, the idler sheave will automatically move away from the belt and interrupt the drive connection.

In addition, the clutch mechanism is incorporated into the basic tiller assembly by providing the mount for the idler sheave assembly as an integral part of the gear box. Specifically, pin 21 carrying the bracket 19 is journaled in mount 20 which is an elongated hole die cast as an integral part of the gear box housing and without requiring machining. This results in a compact arrangement requiring a relatively small number of component parts.

To emphasize the fact that the natural tendency of the belt to straighten from the full line to the dotted line position illustrated in FIG. 1 may constitute the biasing force on the idler sheave assembly tending to pivot it counterclockwise, the drive, driven and idler sheaves may be arranged in a horizontal plane and still function effectively. In that type of orientation, without a holding force on projection 29, the straightening tendency of the belt will overcome the weight of the idler sheave assembly and move it outwardly until the belt goes slack and begins to slip on the drive and/or driven sheaves.

Although but one embodiment of the present invention has been illustrated and described, it will be apparent to those skilled in the art that various changes and modifications may be made therein without departing from the spirit of the invention or from the scope of the appended claims.

We claim:

1. In apparatus of the type described having a frame, an engine, an assembly to be rotated by said engine, and clutch means for selectively transmitting motion from said engine to said assembly, and characterized in that said clutch means comprises, a drive sheave connected to and driven by said engine, a driven sheave spaced from said drive sheave and connected to said assembly, flexible belt means extending between and normally loosely engaging said drive and driven sheaves in a manner such that said belt means does not transmit motion between said drive and driven sheaves, an idler sheave, first bracket means pivotally mounted in a housing portion of said rotating assembly and connected to and supporting said idler sheave for pivotal movement toward and away from said belt at a point intermediate said drive and driven sheaves, second bracket means spaced from said first bracket means and pivotally mounted relative to said drive and driven sheaves, means connecting said first and second bracket means for transmitting pivotal movement therebetween, control means connected to said second bracket means and operative to pivot said second bracket means, said idler sheave biased toward a normal position wherein said idler sheave is out of operative tensioning engagement with said belt and said belt will be slack relative to said drive and driven sheaves, and said control means operative to selectively pivot said second bracket means in a direction which is transmitted through said connecting means to said first bracket means and pivots said idler sheave toward said belt to tighten said belt on said drive and driven sheaves to transmit rotary motion therebetween.

2. The apparatus of claim 1 wherein the housing portion in which said first bracket means is mounted includes first and second joined die-cast portions and said mount is located at the joint between said die-cast portions.

3. The apparatus of claim 1 wherein said connecting means comprises a tension spring extending between and connected to said first and second bracket means to transmit movement therebetween and accommodate overtravel of said second bracket means to prevent excessive tension being applied to said belt.

4. The apparatus of claim 1 wherein one of said driving and driven sheaves has a larger diameter than the other and said idler sheave engages said belt adjacent said larger diameter sheave.

5. The apparatus of claim 1 wherein
said first bracket is positioned adjacent said larger sheave and projects at an angle to a vertical line through the axis of said driven sheave to one side of said driven sheave and outside said belt, said first bracket means being free to pivot in a first direction away from said belt when the manipulative force of said control means is released whereby the bias acting on said first bracket means is gravity, and said first bracket means; in response to movement of said second bracket means, being pivoted in an opposite direction toward and to tension said belt on said sheaves.

6. The apparatus of claim 1 wherein said rotating assembly includes a gear box having a housing having two joined die-cast portions and the mount for said first bracket means is formed at said joint as an integral portion of said gear box.

7. The apparatus of claim 1 wherein said drive and driven sheaves are spaced one above the other,
said first bracket means projects at an angle to a vertical line through the axis of said driven sheave to one side of said driven sheave and outside of said belt, and said second bracket means disposed on the opposite side of said belt,
said first bracket means being pivoted to said frame adjacent said driven sheave and projecting upwardly above said driven sheave and being free to pivot in a first direction away from said belt when the manipulative force on said control means is released so that the bias acting on said idler sheave is gravity.

* * * * *